United States Patent
Palamides et al.

(10) Patent No.: US 6,715,754 B2
(45) Date of Patent: Apr. 6, 2004

(54) DEVICE FOR DEVIATING AN OVERLAPPING STREAM ON A ROLLER TABLE

(75) Inventors: Stefano Palamides, Merklingen (DE); Wolfgang Pfeiffer, Stuttgart (DE); Johannes Oldenkott, Hausen (DE); Marcus Gasser, Bietigheim-Bissingen (DE)

(73) Assignee: Palamides GmbH, Renningen (DE)

( * ) Notice: Subject to any disclaimer, the term of this patent is extended or adjusted under 35 U.S.C. 154(b) by 0 days.

(21) Appl. No.: 10/149,941

(22) PCT Filed: Dec. 12, 2000

(86) PCT No.: PCT/EP00/12572
§ 371 (c)(1), (2), (4) Date: Sep. 11, 2002

(87) PCT Pub. No.: WO01/44090
PCT Pub. Date: Jun. 21, 2001

(65) Prior Publication Data
US 2003/0020233 A1 Jan. 30, 2003

(30) Foreign Application Priority Data
Dec. 14, 1999 (DE) .......................... 199 60 347

(51) Int. Cl.⁷ .................. B65H 5/24; B65H 5/36; B65H 5/06; B65H 9/10
(52) U.S. Cl. .................. 271/234; 271/253; 271/254; 271/184; 198/36; 198/456
(58) Field of Search .................. 271/254, 253, 271/248, 264, 234, 184; 198/36, 456, 370.07, 890

(56) References Cited

U.S. PATENT DOCUMENTS

| | | | | | |
|---|---|---|---|---|---|
| 2,528,106 A | | 10/1950 | Albrecht | | |
| 2,726,751 A | * | 12/1955 | Levitt | ........................ | 198/437 |
| 2,818,954 A | * | 1/1958 | Vice | ........................ | 193/35 C |
| 3,045,792 A | * | 7/1962 | Greller | ........................ | 193/36 |
| 3,091,322 A | * | 5/1963 | Hector et al. | ................ | 198/437 |
| 3,512,638 A | * | 5/1970 | Chengges et al. | ........... | 209/583 |
| 3,800,696 A | * | 4/1974 | Goto et al. | ..................... | 101/6 |
| 3,881,721 A | * | 5/1975 | Hitch | .......................... | 271/184 |
| 3,912,062 A | * | 10/1975 | Hutchinson | .................. | 193/36 |
| 3,912,258 A | * | 10/1975 | Martin | ........................ | 271/184 |
| 4,014,539 A | * | 3/1977 | Goodwin | ...................... | 271/184 |
| 5,004,220 A | * | 4/1991 | Dreschel et al. | ............. | 271/184 |
| 5,027,939 A | * | 7/1991 | Kilper et al. | ................ | 198/890 |
| 5,238,164 A | * | 8/1993 | Freeman | ........................ | 225/4 |
| 5,503,386 A | | 4/1996 | Straessler et al. | | |
| 5,971,132 A | * | 10/1999 | Bonnet | .................. | 198/370.07 |
| 6,223,887 B1 | * | 5/2001 | Andou | .................... | 198/468.1 |
| 6,481,559 B1 | * | 11/2002 | Maeda et al. | .......... | 198/370.02 |

FOREIGN PATENT DOCUMENTS

| | | | | |
|---|---|---|---|---|
| DE | 3926608 AI | | 3/1990 | |
| DE | 19960347 C2 | | 11/2001 | |
| EP | 581050 | * | 7/1993 | ................. 271/184 |
| FR | 2743549 | | 1/1993 | |
| GB | 2080754 | | 2/1982 | |
| JP | 57-93805 | * | 6/1982 | .................. 193/36 |
| JP | 63-127952 | * | 5/1988 | ................. 271/227 |
| JP | 4101912 | | 4/1992 | |
| WO | WO 94/13566 | | 11/1992 | |

* cited by examiner

Primary Examiner—Donald P. Walsh
Assistant Examiner—Daniel K Schlak
(74) Attorney, Agent, or Firm—Louis J. Bovasso; Greenberg Traurig, LLP

(57) ABSTRACT

A device is provided for diverting an imbricated flow of printed products that is transported on a roller table having a plurality of rollers arranged one behind the other. The device comprises an elongated adjustment member whose position can be varied within a sliding plane extending in parallel to a transportation plane defined by the rollers. The device further comprises a plurality of guide elements for guiding the imbricated flow. The guide elements extend into clearances formed between every two rollers and are received on the adjustment member for rotation relative to the adjustment member in a direction perpendicular to the sliding plane and for sliding movement in lengthwise direction of the adjustment member.

8 Claims, 4 Drawing Sheets

DEVICE FOR DEVIATING AN OVERLAPPING STREAM ON A ROLLER TABLE

CROSSREFERENCE OF PENDING APPLICATION

This is a 371 of pending international application PCT/EP00/12572 filed on Dec. 12, 2000 which designates U.S.

BACKGROUND OF THE INVENTION

The present invention relates to a device for diverting an imbricated flow of printed products that is transported on a roller table having a plurality of rollers arranged one behind the other.

Roller tables of this kind are used for transporting imbricated flows of printed products especially in printing plants. The term imbricated flow of printed products is used to describe a number of flat and relatively flexible printed articles, such as newspapers, leaflets or magazines, which are arranged one behind the other and partially overlap each other. Roller tables have been employed heretofore for transporting imbricated flows of printed products transversely to the lengthwise direction of the rollers. In many cases, however, a need exists to divert an imbricated flow or to vary the direction of an imbricated flow depending on the requirements of the particular case.

The use of special roller tables also permits imbricated flows of printed products to be transported along curved paths. Such special roller tables comprise for this purpose conically shaped rollers arranged one behind the other along a curved path. The path of each roller table is, however, firmly defined by the particular arrangement of the rollers.

In the case of another known device, the imbricated flow of printed products is transported on broad belts that revolve between two diverting rollers. The belts can be mounted on the diverting rollers in different positions so that the direction of the imbricated flow can be varied by changing the position of the belts on the diverting rollers. However, operation necessarily has to be interrupted in this case for any change in direction.

In addition, there have been known roller tables for transportation of stiffer objects, such as cardboard boxes, where baffle plates are arranged above the rollers that divert the objects on the roller table in lateral direction. Such plates are, however, not suited for changing the direction of imbricated flows of printed products because due to their small thickness and their flexibility these tend to duck under the baffle plates and to get jammed in the gap between the rollers and the baffle plates.

It is the object of the invention to provide a device for diverting an imbricated flow of printed products on a roller table, which allows even relatively flexible imbricated flows of printed products to be diverted on a roller table of that kind. The diverting direction should be freely selectable within predetermined limits.

SUMMARY OF THE INVENTION

This object is achieved by a device comprising an elongated adjustment member whose position can be varied within a sliding plane extending in parallel to a transportation plane defined by the rollers. The device further comprises a plurality of guide elements for guiding the flow, the guide elements extending into clearances formed between every two rollers and being received on the adjustment member for rotation relative to the adjustment member in a direction perpendicular to the sliding plane and for sliding movement in lengthwise direction of the adjustment member.

By having the guide elements extending into the clearance between every two rollers, one efficiently prevents the rollers and the guide elements from forming between them a gap of a kind in which the imbricated flow may get jammed. This tendency of the imbricated flow, namely to get jammed when moving in oblique direction relative to the transport direction defined by the rotation of the rollers, is due to the small thickness and the comparatively high degree of flexibility of the printed products.

Due to the fact that the guide elements are mounted on the adjustment member for rotation in a direction perpendicular to the sliding plane and for displacement in the lengthwise direction of the adjustment member, the diverting sense can be varied as desired, at least within defined limits, which means that a choice is provided not only between left or right, but also with respect to the diverting angle. During variation of the direction of the adjustment member, the guide elements only move in the lengthwise direction of the rollers so that the clearances between the rollers remain filled by the guide elements.

According to a preferred embodiment of the invention, each of the guide elements is provided on its bottom, facing the rollers, with two oppositely arranged partially cylindrical recesses having a contour that substantially corresponds to an outer surface of the rollers. This results in a minimal gap remaining between the rollers and the guide elements, which is necessary to allow rotation of the rollers under the guide elements. It is, thus, practically excluded that an imbricated flow of printed products guided on the device may get jammed between the guide elements and the rollers or between different rollers.

According to another advantageous embodiment of the invention, the adjustment member comprises two parallel, mutually spaced bars that define a gap. Each of the guide elements comprises a journal projecting from its upper surface opposite the rollers and engaging into the gap. This embodiment permits, in a constructionally very simple way, rotation of the guide elements in a direction perpendicular to the sliding plane, and sliding of the guide elements in the lengthwise direction of the adjustment members.

According to another advantageous embodiment of the invention, at least some of the guide elements each comprise pressure means for pressing a flow to be diverted against the rollers from above. A pressure means of this type is of advantage especially in cases where the imbricated flow consists of particularly light-weight printed products. The pressure means ensures in this case that sufficient friction exists between the rollers and the imbricated flow of printed products to drive the flow in the desired way.

According to an advantageous further improvement of that embodiment, the pressure means take the form of a ball retained in a ring that is connected with the guide element so as to allow vertical movement of the ball. The pressing force required is then derived from the weight of the ball as such. The fact that the ball is allowed to rotate in the ring keeps friction between the pressure means and the imbricated flow of printed products at a minimum level.

According to another advantageous embodiment of the invention, a first and a second clamping rail are arranged on a forward and on a rear end of the roller table, respectively. The adjustment member is detachably mounted on the clamping rails by means of clamping screws. This embodiment allows, in a constructionally especially simple way, the position of the adjustment member to be varied in the sliding plane. For, in order to vary the position of the adjustment member, it is only necessary to untighten the clamping screws and to fix the adjustment member in a different orientation between the two clamping rails by retightening the clamping screws appropriately. This embodiment also permits a plurality of adjustment members to be arranged above the roller table in the described way, without a need to provide separate adjusting means for each adjustment member.

According to another advantageous embodiment of the invention, the guide elements are delimited, in the transport direction defined by the rollers, by two plane sliding surfaces, which are arranged parallel one to the other and perpendicular to the transport direction. The guide elements are positioned along the adjustment member so as to ensure that, irrespective of the position of the adjustment members, every two neighboring guide elements are in contact one with the other along their sliding surfaces. The guide elements thus provide continuous guidance for the imbricated flow of printed products, irrespective of the position of the adjustment member, thereby preventing the imbricated flow from ducking below or between the guide elements.

BRIEF DESCRIPTION OF THE DRAWINGS

Further advantages and features of the invention can be derived from the embodiments that will be described hereafter by reference to the drawings in which.

BRIEF DESCRIPTION OF PREFERRED EMBODIMENTS

Figure 1:
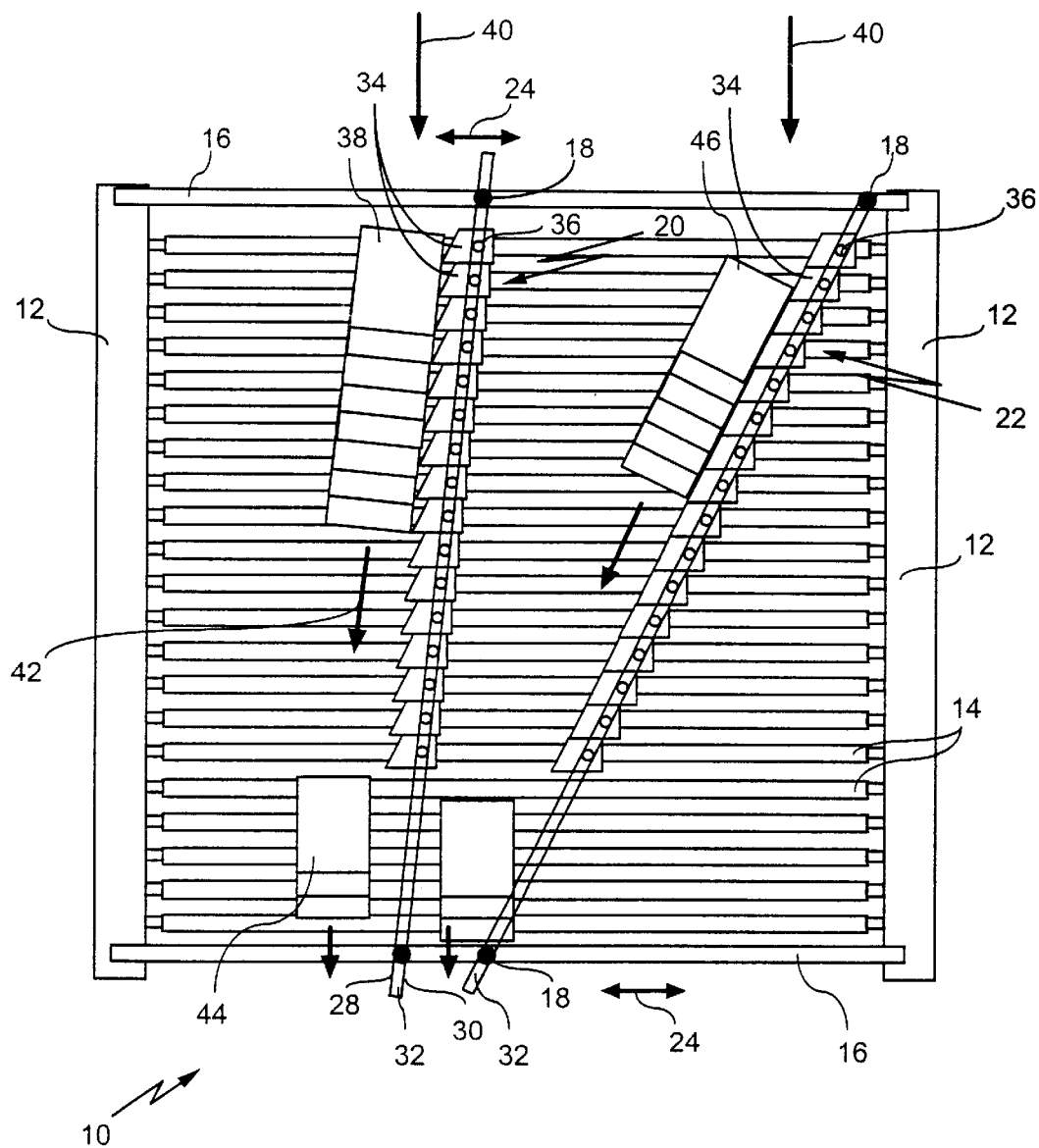
FIG. 1 shows a top view of a roller table comprising a device according to the invention.

The roller table illustrated in FIG. 1 is indicated in its entirety by reference numeral 10 and is provided, on each of its two sides, with mounting supports 12 between which rollers 14 are arranged one behind the other. The rollers 14 are provided with a stainless-steel jacket and are driven, in the illustrated embodiment, by a drive unit not shown in detail in FIG. 1. The rollers 10 may, however, as well be driven either not at all or only in part. Further, it is also possible to give the roller table 10 an inclined structure so that an imbricated flow of printed products to be transported will move across the rollers 10 solely under the influence of gravity, thereby causing the rollers to rotate.

Clamping rails 16, which have their ends mounted on the mounting supports 12, extend in parallel to the rollers 14 at the upper and the lower ends of the roller table 10. Two diverting devices 20 and 22 are mounted on the clamping rails 16, by means of clamping screws 18, in a manner such that the position of the diverting devices 20 and 22 above the roller table 10 can be varied after the clamping screws 18 have been untightened. To this end, the ends of the diverting devices 20 and 22 are displaced longitudinally above the clamping rails 16, in the direction indicated by arrows 24, and are then fixed again in the desired position by re-tightening the clamping screws 18.

The diverting device 20 consists essentially of an elongated adjustment member 32, composed of two bars 28 and 30, and a number of guide elements 34 held thereon. The upper surface, facing the viewer, of each of the guide elements 34 is provided with a journal 36 that projects into a gap formed between the bars 28 and 30. This allows the guide elements 34 to rotate vertically relative to the plane defined by the arrangement of the rollers 14. In addition, the guide elements can be displaced along the adjustment member 32. The bottom faces of the guide elements 34 rest on the rollers 14. Thus, the adjustment member 32 has a mere guiding function, not a carrying function, with respect to the guide elements 34.

In FIG. 1, reference numeral 38 indicates an imbricated flow of printed products, it being supposed that this flow is initially fed to the roller table 10 in the direction indicated by arrow 40. During this motion, the forward edge of the flow 38 will eventually hit against the first guide element 34 of the diverting device 20 and will be diverted by the latter to the right, viewed in the direction of movement 40. The flow 38 then continues to move in the direction indicated by arrow 42 along the diverting device 20. As the direction of movement is now no longer perpendicular to the rollers 14, but slightly inclined relative to the perpendicular direction, the flow 38 is subjected to a torque that tends to turn the flow 38 back to its original direction of movement 40. As a result of that torque, the flow 38 returns to its original direction of movement 40 after it has passed the last guide element 34 at the end of the diverting device 20. This is indicated by the flow with reference numeral 44 at the lower end of the roller table 10.

The second diverting device 22 is designed in the same way as the diverting device 20, but is mounted in a different position above the roller table 10. As can be seen very well in FIG. 1, the guide elements 34 are always located above the rollers 14 in this different position, too. The distance between the journals 36 is greater in this different position than in the case of the diverting device 20. In addition, the angle between the guide elements 34 and the adjustment member 32 is larger with the diverting device 22 than in the case of the diverting device 20. The lateral surfaces of the guide elements 34, acting as stops, are aligned in that position so that one lateral edge of the imbricated flow of printed products 38 is in planar contact with those surfaces. The diverting device 22 is shown in its extreme position, where the angle between the diverting device and the direction of movement 40 defined by the rollers 14 is at its maximum. If the adjustment members 32 were inclined still further, the guide elements 34 would get displaced one relative to the other to such a degree that projections would be produced that would stop the movement of the flow 46.

Figure 2:
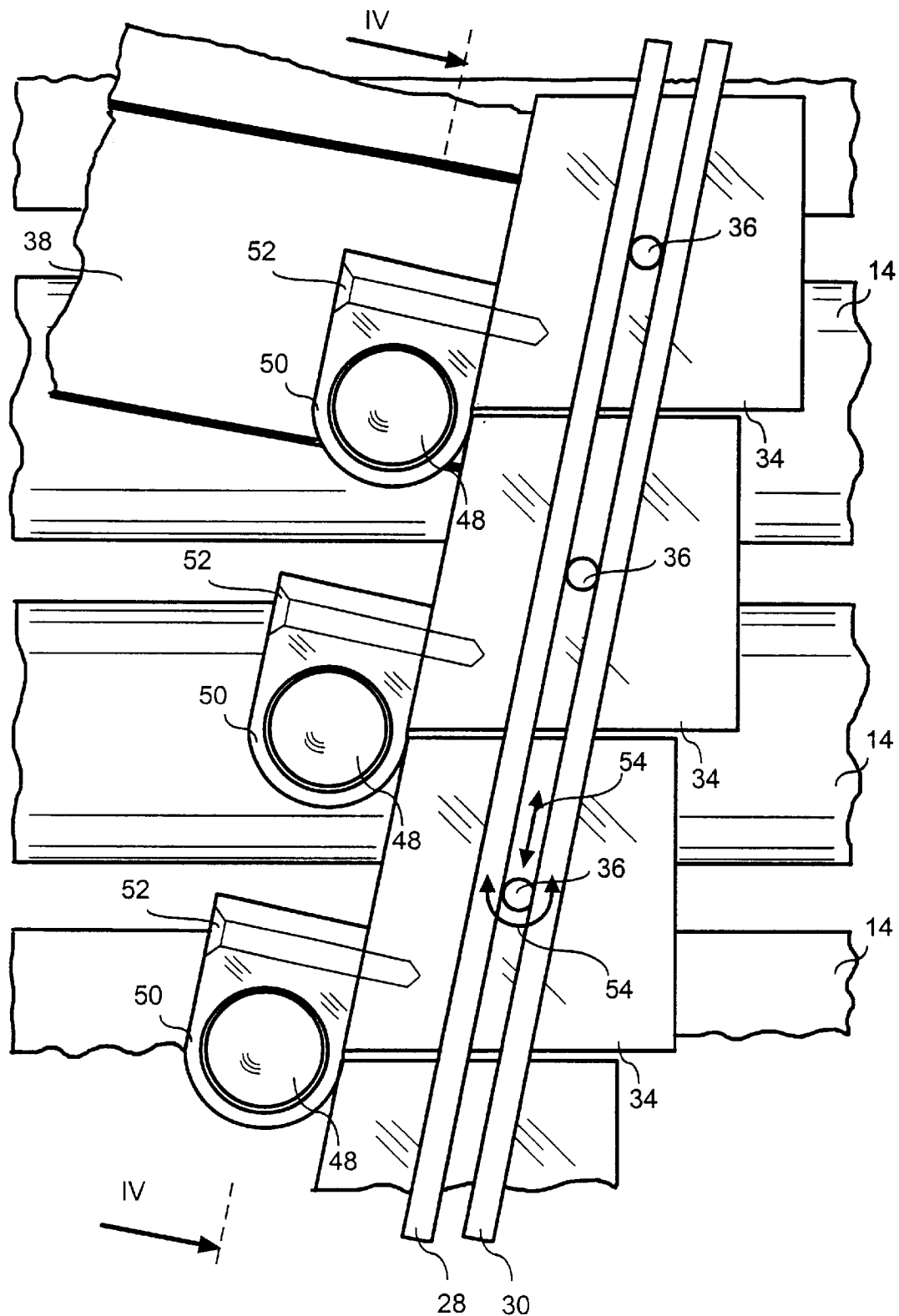
FIG. 2 shows an enlarged representation of a top view of part of the roller table, with guide elements provided with pressure means.

FIG. 2 shows an enlarged view of a detail of the roller table 10. Each of the guide elements 34 is provided with pressure means which have been omitted in FIG. 1 for the sake of clarity. The pressure means comprise balls 48 that are retained in rings 50. The rings 50 are mounted on the guide elements 34 by means of screws 52. The own weight of the balls 48 presses an imbricated flow of printed products 38, guided by the guide elements 34, against the rollers 14 from above. Given the fact that the balls 48 are permitted to move in vertical direction in the ring 50, a constant contact pressure can be achieved even with imbricated flows of different thickness. Arrows 54 in FIG. 2 indicate the directions in which the guide elements 34 are permitted to move as a result of the journals 36 being guided between the bars 28 and 30.

Figure 3:
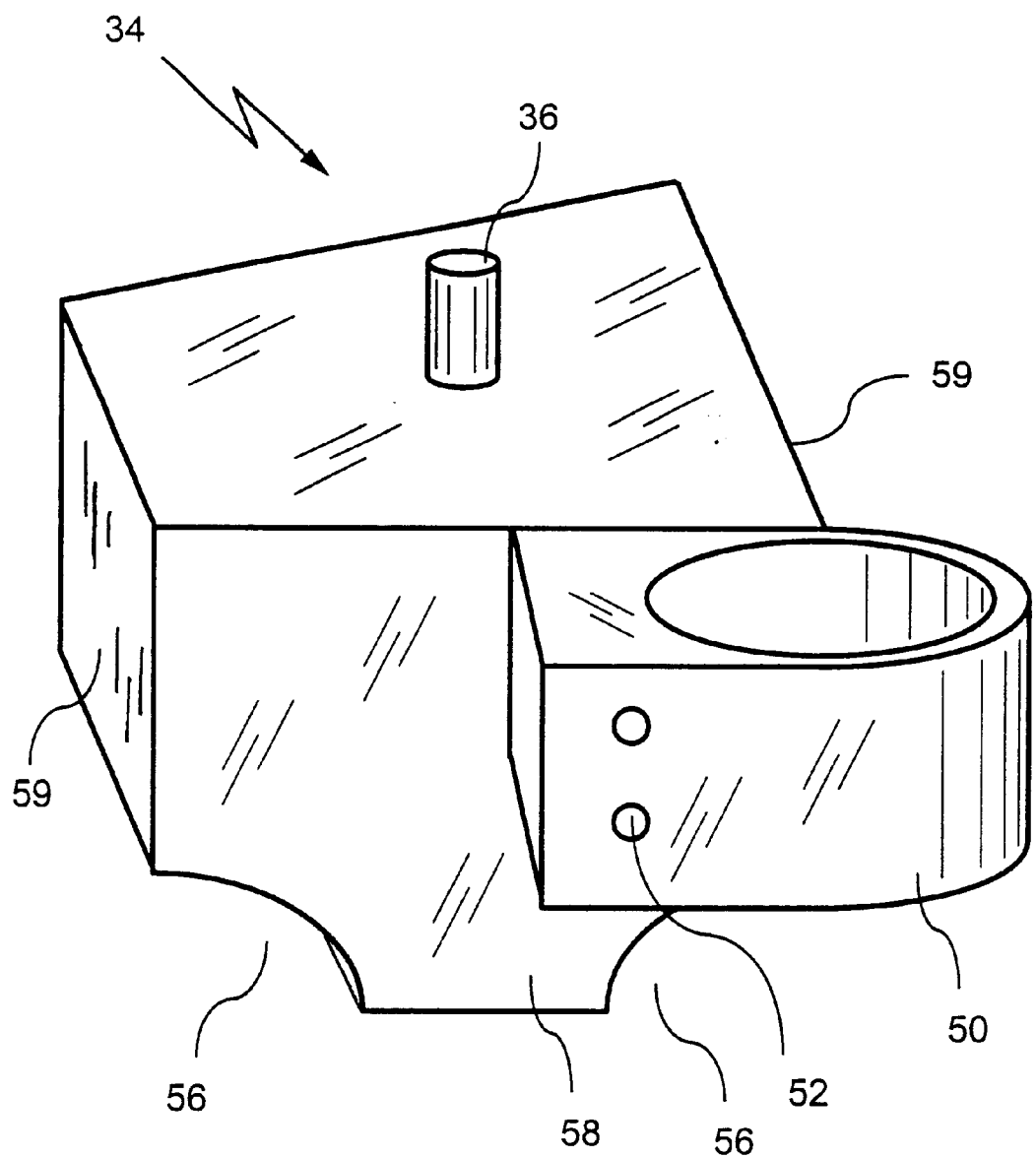
FIG. 3 shows a perspective representation of a guide element with pressure means, but without a ball.

FIG. 3 shows a perspective view of a guide element 34 with a journal 36 and a ring 50. Two partially cylindrical recesses 56, provided one opposite the other in the bottom surface of the guide element 34, form between them a web 58. The guide elements 34 rest on the rollers 14 via the partially cylindrical surfaces formed by the recesses 56 so that each of the webs 58 comes to extend into the clearance between two neighboring rollers 14. The arrangement of the guide elements 34 one relative to the other is such that only a narrow gap is left between the two parallel lateral surfaces 59 of the guide elements 34, as indicated in FIG. 2. Alternatively the guide elements 34 may, however, be arranged along the adjustment member 32 so tightly together that the lateral surfaces 59 of neighboring guide elements 34 are in sliding contact one relative to the other.

Figure 4:
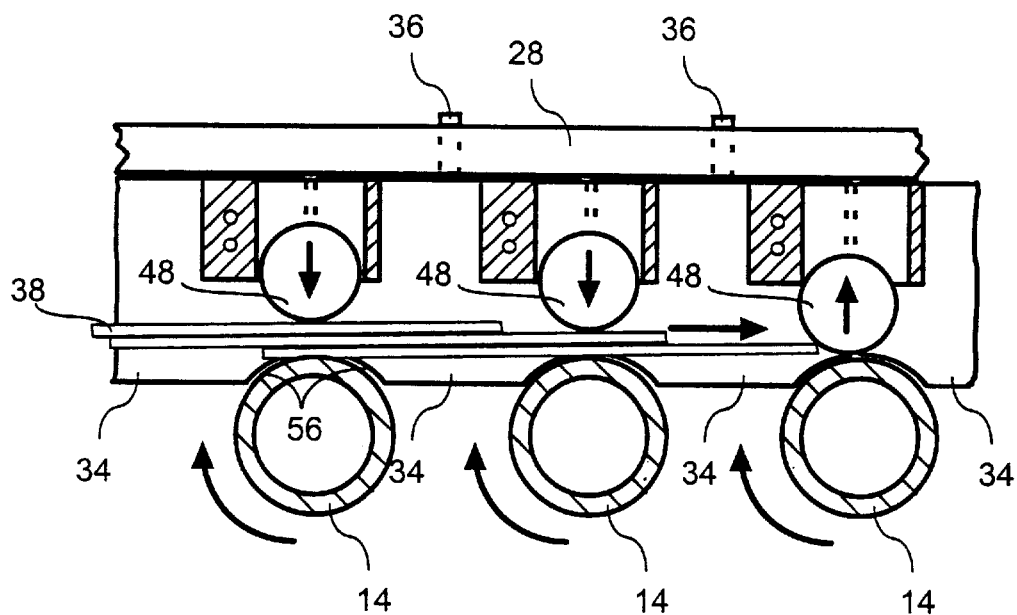
FIG. 4 shows a sectional view taken along line IV—IV in FIG. 2, but with the imbricated flow of printed products in a further advanced position.
Figure 5:
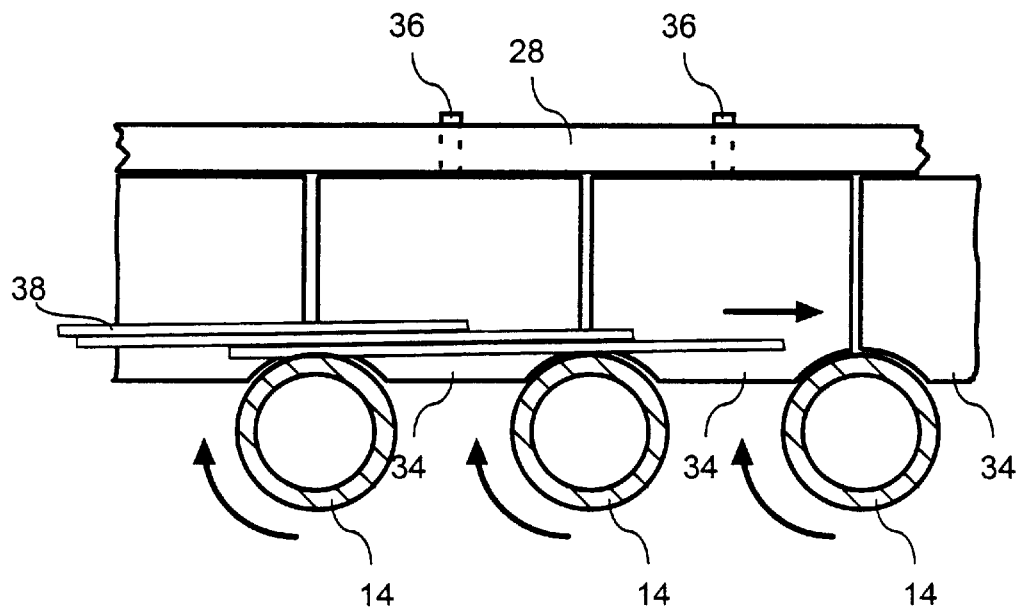
FIG. 5 shows a sectional view corresponding to FIG. 4, where the guide elements do not comprise any pressure means.

This is clearly visible in the lateral sectional view of FIG. 4, taken along line IV—IV in FIG. 2. FIG. 5 shows a corresponding sectional view, but without the pressure means. FIGS. 4 and 5 illustrate the planar contact between the partially cylindrical surfaces of the guide elements 34 and the outer surfaces of the rollers 14 in the area of the recesses 56. The area between the recesses 56 extends so deeply into the space between two neighboring rollers that it comes to lie under the bottom surface of the imbricated flow of printed products. In order to improve the sliding properties between the guide elements 34 and the rollers 14, the guide elements 34 are made from a nylon-like plastic material, such as POM.

The guide elements 34 are permitted to slide past each other in the lengthwise direction of the rollers 14, i.e. perpendicularly to the plane of the paper in FIGS. 4 and 5. FIG. 4 shows how the imbricated flow of printed products 38 is pressed down by the balls 48 against the rollers 14. When no flow is present, each ball 48 rests on the apex of the respective roller 14. This condition is shown at the extreme right in FIG. 4. The imbricated flow 38 then automatically lifts the balls 48 as necessary, so that flows of printed products of different thickness can be pressed against the rollers 14 by the balls 48 at uniform pressure.

It is understood that the embodiment described above can be varied in various ways. For example, the adjustment members 32 may be provided with a curvature that increases progressively in the transport direction. This helps prevent the imbricated flow from hitting hard against the first guide element 34, especially in cases where the flow is to be diverted by a large angle.

In addition, it is also imaginable, for imbricated flows of printed products that are not so flexible, to arrange the guide elements 34 not in direct contact with the rollers 14, but slightly above the latter. One thereby prevents friction losses that may arise as a result of friction between the rollers 14 and the guide elements 34. For mounting the guide elements 34 on the adjustment member 32, plate washers may be screwed into the journals 36 from above so that their edges extend beyond the bars 28 and 30. This has the effect that the guide elements 34 are suspended on the adjustment member 32, but are still permitted to perform the necessary rotary and lengthwise movements. For varying the diverting direction, one initially lowers the adjustment member 32, whereby the guide elements 34 come to rest on the rollers 14. When the position of the adjustment member 32 is then varied, the alignment between the guide elements 34 and the rollers 14 remains unchanged. Finally, the adjustment member is lifted again.

It is of course also possible to vary the position of the adjustment member by electromechanical means. There is then the possibility to design program-controlled routing points by means of which imbricated flows of printed products can be separated and diverted in different directions.

The invention is not limited to the embodiments described above but all changes and modifications thereof, not constituting departures from the spirit and scope of the invention, are intended to be included.

What is claimed is:

1. A device for diverting an imbricated flow of printed products that is transported on a roller table having a plurality of rollers arranged one behind the other, the device comprising:

an elongated adjustment member whose position can be varied within a sliding plane extending in parallel to a transportation plane defined by rollers of a roller table, and a plurality of guide elements for guiding said flow, said guide elements extending into clearances formed between every two rollers and being received on said adjustment member for rotation relative to said adjustment member in a direction perpendicular to said sliding plane and for sliding movement in lengthwise direction of said adjustment member.

2. The device of claim 1, wherein each of said guide elements is provided on its bottom, facing said rollers, with two oppositely arranged partially cylindrical recesses having a contour that substantially corresponds to an outer surface of said rollers.

3. The device of claim 1, wherein said adjustment member comprises two parallel mutually spaced bars that define a gap, and wherein each of said guide elements comprises a journal projecting from its upper surface opposite said rollers and engaging into said gap.

4. The device of claim 1, wherein at least some of said guide elements each comprise pressure means for pressing a flow to be diverted against said rollers from above.

5. The device of claim 4, wherein said pressure means take the form of a ball retained in a ring that is connected with said guide element so as to allow vertical movement of said ball.

6. The device of claim 1 comprising a first and a second clamping rail that are is arranged on a forward and on a rear end of said roller table, respectively, wherein said adjustment member is detachably mounted on said clamping rails by means of clamping screws.

7. The device of claim 1, wherein said guide elements are delimited, in a transport direction defined by said rollers, by two plane sliding surfaces, which are arranged parallel one to the other and perpendicular to said transport direction, and wherein said guide elements are positioned along said adjustment member so as to ensure that, irrespective of the position of said adjustment member, every two neighboring guide elements are in contact one with the other along their sliding surfaces.

8. A roller table for transporting an imbricated flow of printed products, comprising:

a plurality of rollers arranged one behind the other, a device for diverting said flow on said rollers, the device comprising an elongated adjustment member whose position can be varied within a sliding plane extending in parallel to a transportation plane defined by said rollers, and a plurality of guide elements for guiding said flow, said guide elements extending into clearances formed between every two rollers and being received on said adjustment member for rotation relative to said adjustment member in a direction perpendicular to said sliding plane and for sliding movement in lengthwise direction of said adjustment member.

* * * * *

UNITED STATES PATENT AND TRADEMARK OFFICE
CERTIFICATE OF CORRECTION

PATENT NO.    : 6,715,754 B2
DATED         : April 30, 2004
INVENTOR(S)   : Palamides et al.

It is certified that error appears in the above-identified patent and that said Letters Patent is hereby corrected as shown below:

<u>Title page, Item [54] and Column 1, lines 1-3,</u>
Title, should read -- DEVICE FOR DIVERTING AN IMBRICATED FLOW OF PRINTED PRODUCTS ON A ROLLER TABLE --.

Signed and Sealed this

Twenty-second Day of June, 2004

JON W. DUDAS
*Acting Director of the United States Patent and Trademark Office*